(12) United States Patent
Nakajima et al.

(10) Patent No.: US 11,718,224 B2
(45) Date of Patent: Aug. 8, 2023

(54) DISPLAY DEVICE FOR A VEHICLE

(71) Applicant: Yazaki Corporation, Tokyo (JP)

(72) Inventors: Harutoshi Nakajima, Makinohara (JP);
Ami Shibahara, Shimada (JP);
Hiroyuki Oishi, Shimada (JP);
Teruomi Sano, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/720,360

(22) Filed: Apr. 14, 2022

(65) Prior Publication Data
US 2022/0363188 A1 Nov. 17, 2022

(30) Foreign Application Priority Data
May 17, 2021 (JP) .................. 2021-083132

(51) Int. Cl.
 *B60Q 3/217* (2017.01)
 *B60K 37/02* (2006.01)
 *B60Q 3/10* (2017.01)

(52) U.S. Cl.
 CPC .............. *B60Q 3/217* (2017.02); *B60K 37/02* (2013.01); *B60Q 3/10* (2017.02); *B60K 2370/1523* (2019.05)

(58) Field of Classification Search
 CPC .... B06K 2370/152; B06K 37/02; B60Q 3/10; B60Q 3/217
 See application file for complete search history.

(56) References Cited

FOREIGN PATENT DOCUMENTS

| | | | | |
|---|---|---|---|---|
| CN | 112776825 A | * | 5/2021 | ............. B02B 3/00 |
| DE | 102018213058 A1 | * | 3/2020 | ............. B60K 35/00 |
| DE | 102020116986 B3 | * | 11/2021 | |
| JP | 2021-017179 A | | 2/2021 | |

* cited by examiner

*Primary Examiner* — Anabel Ton
(74) *Attorney, Agent, or Firm* — Sughrue Mion, PLLC (57) ABSTRACT

An object of the present invention is to provide a display device for a vehicle which brings a relation between a linear display section of a display panel placed at a dashboard and a linear lighting placed at the dashboard. A display device for a vehicle includes a display panel and a linear lighting placed at a dashboard of an automobile, a linear lighting placed on a lining of a door on a driver seat side, and a linear lighting placed on a lining of a door on a passenger seat side. The display panel is a panel with liquid crystal on its full range, and includes a linear display section which is continuous with an end of the linear lighting. The linear lighting and the linear display section are capable of linked light emission.

6 Claims, 6 Drawing Sheets

DISPLAY DEVICE FOR A VEHICLE

BACKGROUND OF THE INVENTION

Technical Field

The present invention relates to a display device for a vehicle.

Background Art

In recent years, automobiles are increased which are equipped with linear lightings, called ambient lights, at a dashboard and/or door lining (see Patent Document 1). This linear lighting does not only create an interior atmosphere and/or high class impression in a vehicle, but also has a warning function, such as informing a user about a danger by blinking when the vehicle is stopped and the user tries to open a door without being aware of an object approaching the vehicle from backward.

CITATION LIST

Patent Literature

Patent Document 1: JP 2021-017179 A

SUMMARY OF THE INVENTION

The conventional linear lightings (ambient lights) are not provided to have a relation to a display panel (e.g. a meter panel, car navigation display) placed at the dashboard. Therefore, there is a problem such as lack of unity impression of a cockpit and/or insufficient information providing capability for a driver.

Therefore, an objective of the present invention is to provide a display device for a vehicle which brings a relation between a linear display section of a display panel placed at a dashboard and a linear lighting placed at the dashboard.

A display device for a vehicle according to the present invention includes: a display panel configured to be placed at a dashboard; and a linear lighting configured to be placed at the dashboard, the linear lighting extending along a longitudinal direction of the dashboard, wherein a linear display section is positioned in the display panel continuously with an end of the linear lighting or on extension of the linear lighting, and wherein the linear lighting and the linear display section are configured to be able to perform linked light emission.

According to the present invention, it is possible to provide a display device for a vehicle which brings a relation between the linear display section of a display panel and the linear lighting.

DETAILED DESCRIPTION OF THE PREFERRED EMBODIMENTS

A "display device for a vehicle" according to an embodiment of the present invention will be described with reference to FIGS. 1 to 6.

Figure 1:
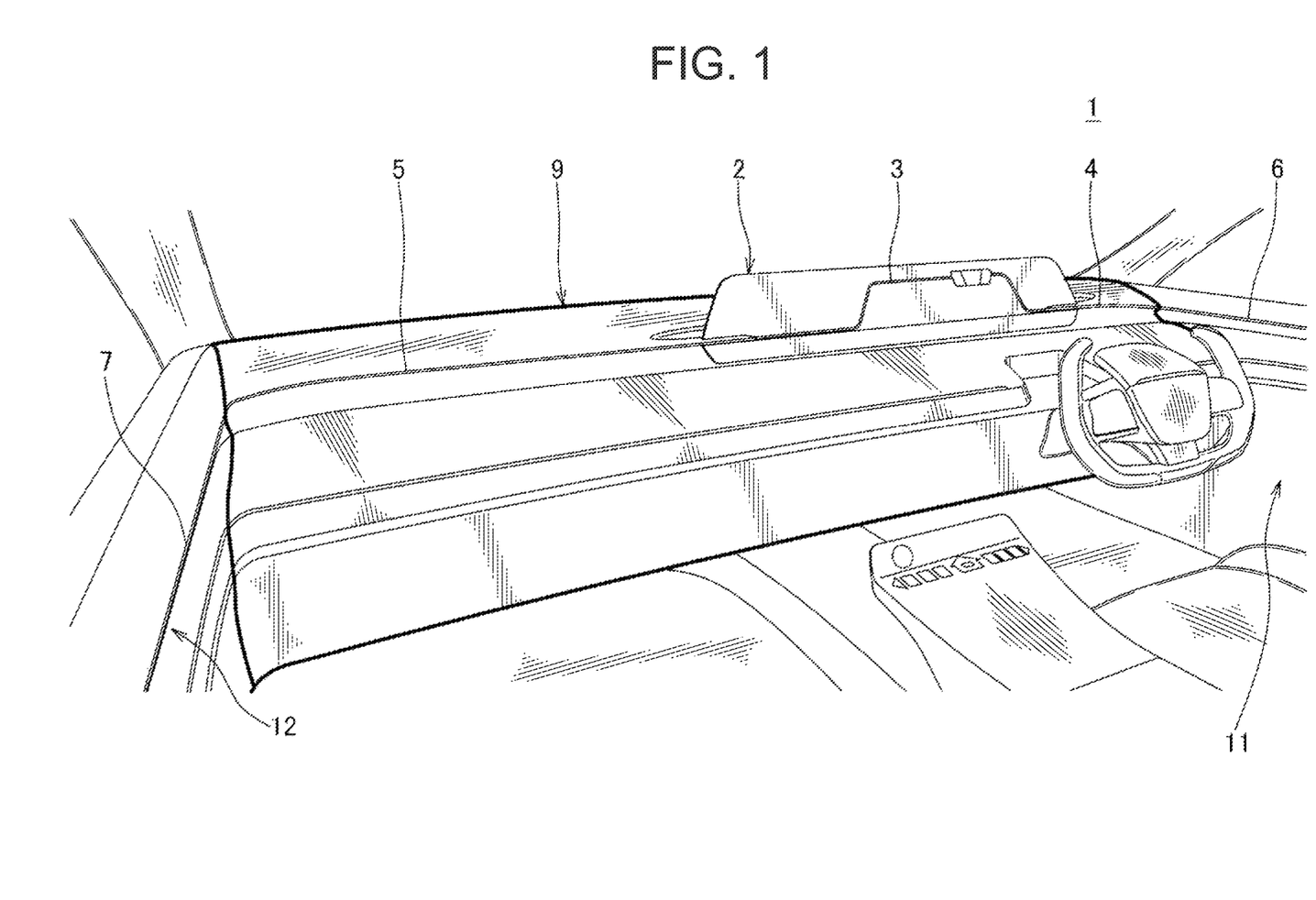
FIG. 1 shows a perspective view of a display device for a vehicle according to an embodiment of the present invention.

A display device 1 for a vehicle as shown in FIG. 1 includes a display panel 2 and linear lightings 4, 5 placed at a dashboard 9 of an automobile, a linear lighting 6 placed on a lining of a door 11 on a driver seat side, and a linear lighting 7 placed on a lining of a door 12 on a passenger seat side.

The display panel 2 according to the present example is a panel with liquid crystal on its full range, wherein the display panel 2 functions as a meter panel, an audio and car navigation display, and has a display function for entertainment information or others. The display panel 2 has a plate shape extending in a longitudinal direction of the dashboard 9. The dashboard 9 has a shape extending in a vehicle width direction. In other words, the dashboard 9 has a longitudinal direction along the vehicle width direction, and a transverse direction along a vehicle height direction.

The linear lightings 4 to 7 are configured as lightings generally called as "ambient lights". The linear lighting 4 extends along the longitudinal direction of the dashboard 9 toward the display panel 2 from a right end of the dashboard 9 when seen from the driver side. The linear lighting 5 extends along the longitudinal direction of the dashboard 9 toward the display panel 2 from a left end of the dashboard 9 when seen from the driver side. For the linear lightings 4 and 5, it is sufficient that they extend along the longitudinal direction of the dashboard 9 in the vicinity of the display panel 2, wherein portions of the linear lightings 4 and 5 far from the display panel 2 do not need to extend along the longitudinal direction of the dashboard 9. The linear lighting 6 extends backward from the vicinity of a right end of the linear lighting 4. The linear lighting 7 extends backward from the vicinity of a left end of the linear lighting 5.

Figure 5:
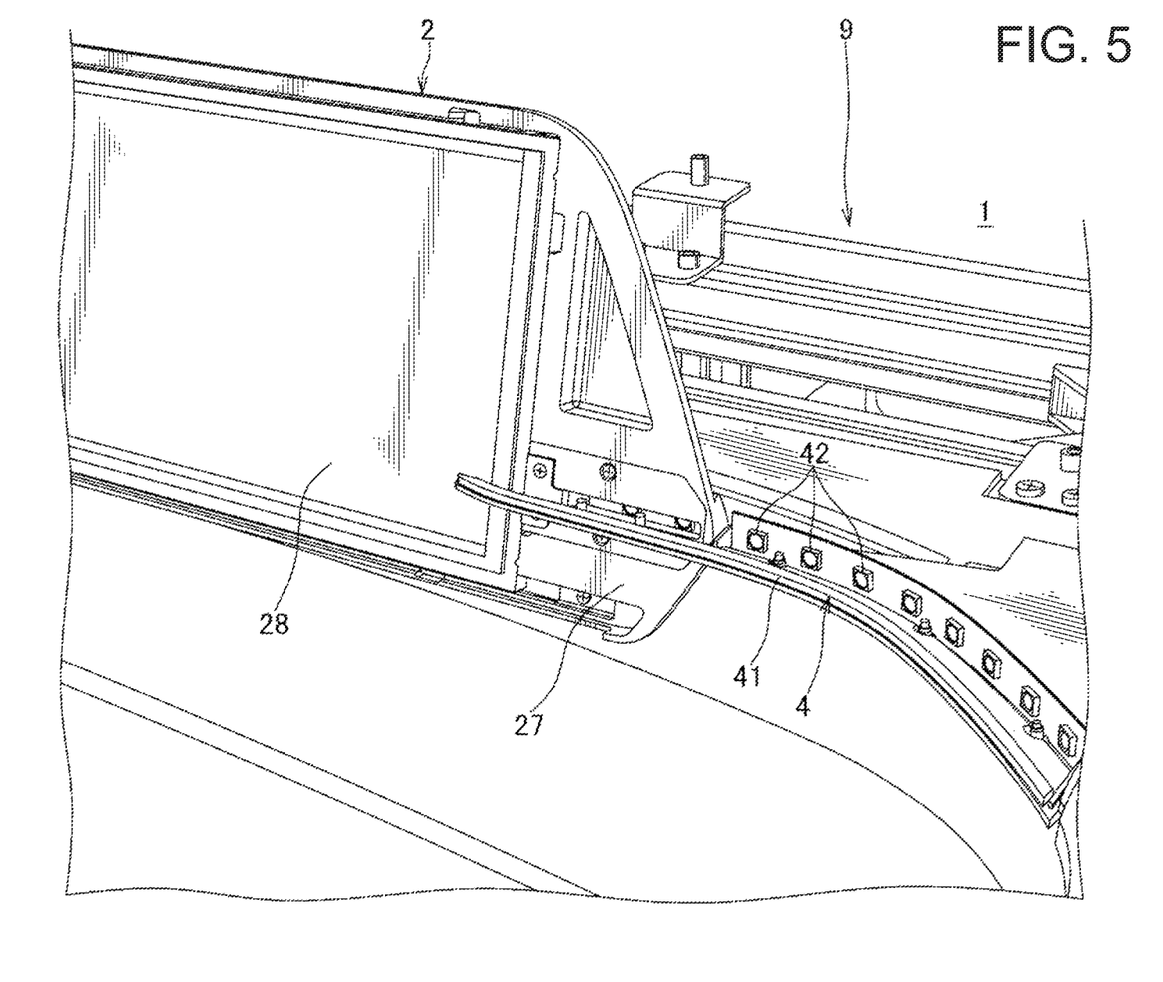
FIG. 5 shows internal structures of a display panel and the linear lighting according to FIG. 4.

As shown in FIG. 5, the linear lighting 4 includes a bar-shaped light guide member 41 and a plurality of full color LEDs 42 arranged along the light guide member 41. The light guide member 41 has a half mirror structure with a metal vapor deposition layer 41a (see FIG. 6) so that the light guide member 41 appears silver when turning off the LEDs 42, and appears as a color of light emitted from the LEDs 42 when turning on the LEDs 42. Although structures of the remaining linear lightings 5 to 7 are omitted in the Drawings, they have the same structure as the linear lighting 4. The linear lightings 4 to 7 are controlled by a control unit which is not shown.

It is sufficient when the display device 1 includes at least one linear lighting 4, 5 (one of the linear lightings 4 and 5), wherein the linear lightings 6, 7 are not mandatory. An additional linear lighting(s) may be placed on a door lining on a rear seat side, wherein the additional linear lighting is continuous with the linear lighting 6, 7.

Figure 2:
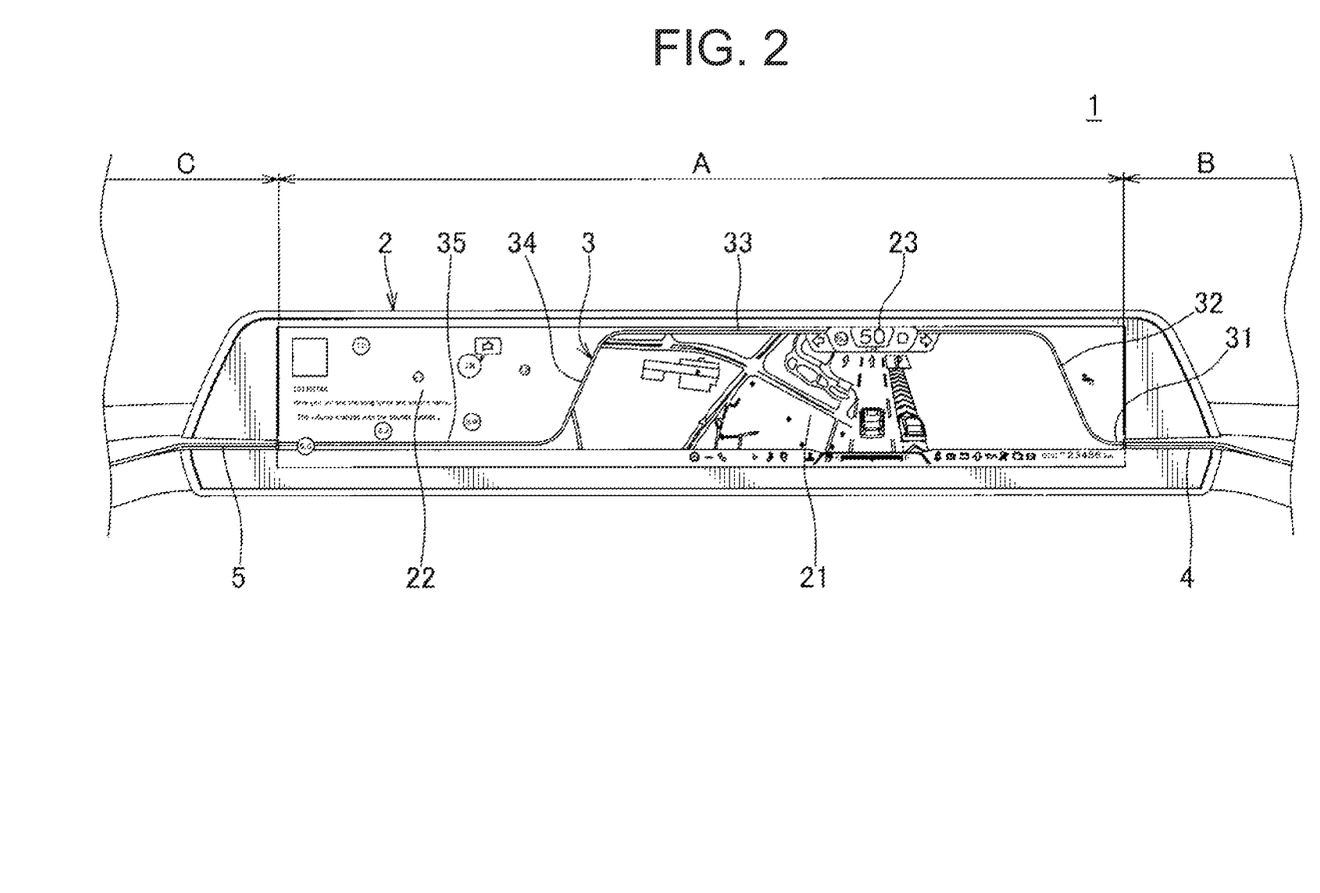
FIG. 2 shows an example for a display on the display device according to FIG. 1.
Figure 3:
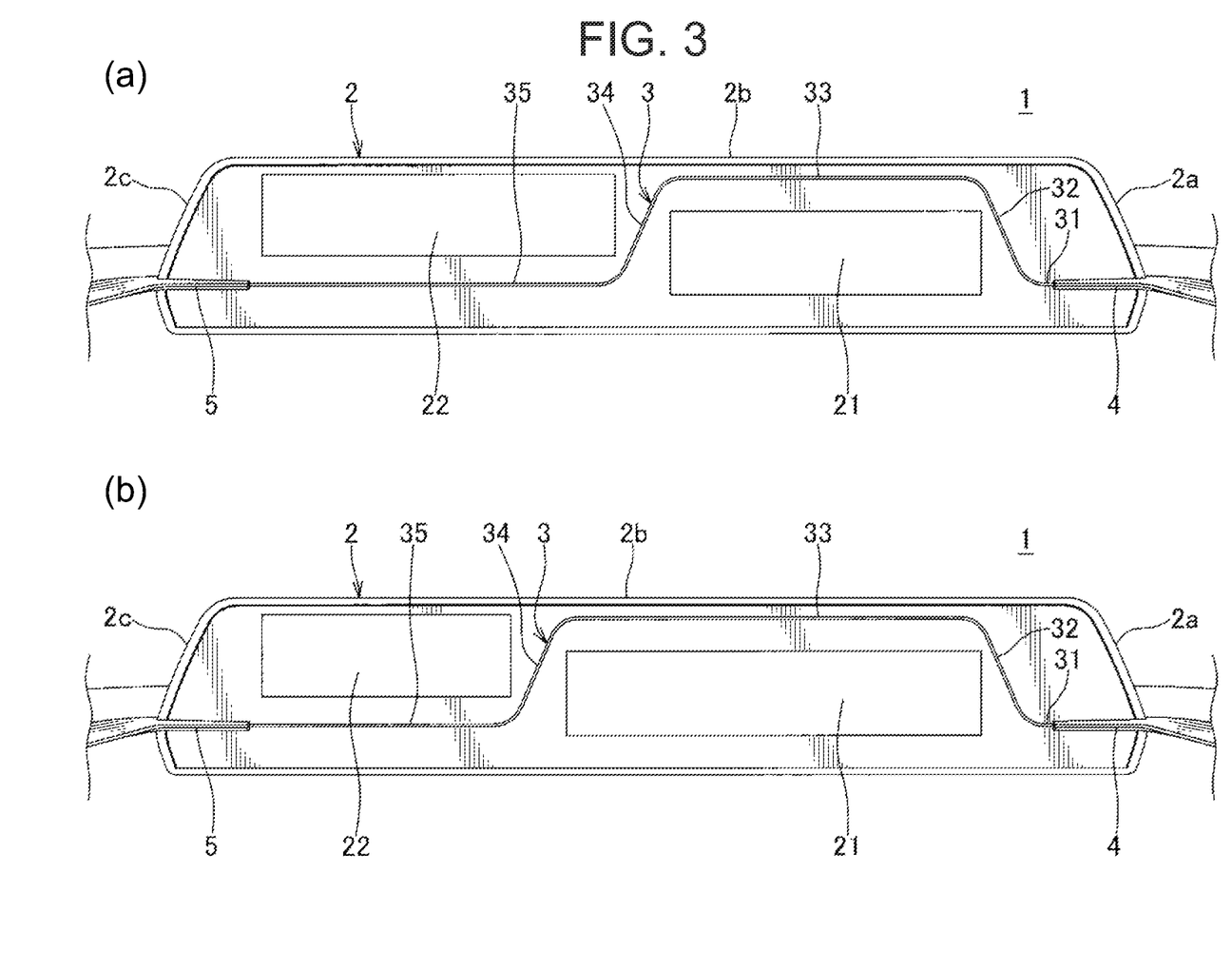
FIG. 3 shows views for explanation of changes of ranges of a first region and a second region according to FIG. 2, wherein (a) shows a state of the first and second regions having similar sizes, and wherein (b) shows a state where the first region is enlarged.

As an example for a display of the display panel 2, the display panel 2 displays a linear display section 3 which is shown in FIGS. 2 and 3. The linear display section 3 includes a first linear portion 31 extending along the longitudinal direction of the dashboard 9, a second linear portion 32 extending upward from an end of the first linear portion 31, a third linear portion 33 extending from an end of the second linear portion 32 along the longitudinal direction of the dashboard 9, a fourth linear portion 34 extending downward from an end of the third linear portion 33, and a fifth linear portion 35 extending from an end of the fourth linear portion 34 along the longitudinal direction of the dashboard 9. The first linear portion 31 is continuous with an end of the linear lighting 4. The fifth linear portion 35 is continuous with an end of the linear lighting 5.

In FIG. 2, the linear display section 3 is displayed in a region A, wherein the linear lighting 4 and the linear lighting 5 are positioned in a region B and a region C, respectively. In a state where the linear display section 3 is displayed and the linear lightings 4 to 7 are turned on, they appear to form one shining continuous line which extends from the door 11 on the driver seat side to the door 12 on the passenger seat side via the dashboard 9. This line may have a single color (the linear lightings 4 to 7 and the linear display section 3 may emit lights of the same color), or multi colors, or have gradation. In addition, their turn-on and turn-off periods may be offset from each other so that they appear as if a light were flowing.

In this manner, the linear display section 3 of the display panel 2 and the linear lightings 4 to 7 may be connected so that a cockpit design is achieved which has a unity impression with a horizontal theme. In the present example, a shape of the linear display section 3 is similar to an outer shape of the display panel 2 in order to increase the unity impression.

Specifically, the second linear portion 32 extends parallel to an edge 2*a* of the display panel 2 at its right end, and the fourth linear portion 34 extends parallel to an edge 2*c* of the display panel 2 at its left end, so that the second linear portion 32, third linear portion 33 and fourth linear portion 34 form a trapezoid shape which is similar to a shape formed by the edges 2*a*, 2*b* and 2*c* of the display panel, as shown in (a) and (b) in FIG. 3.

Figure 4:
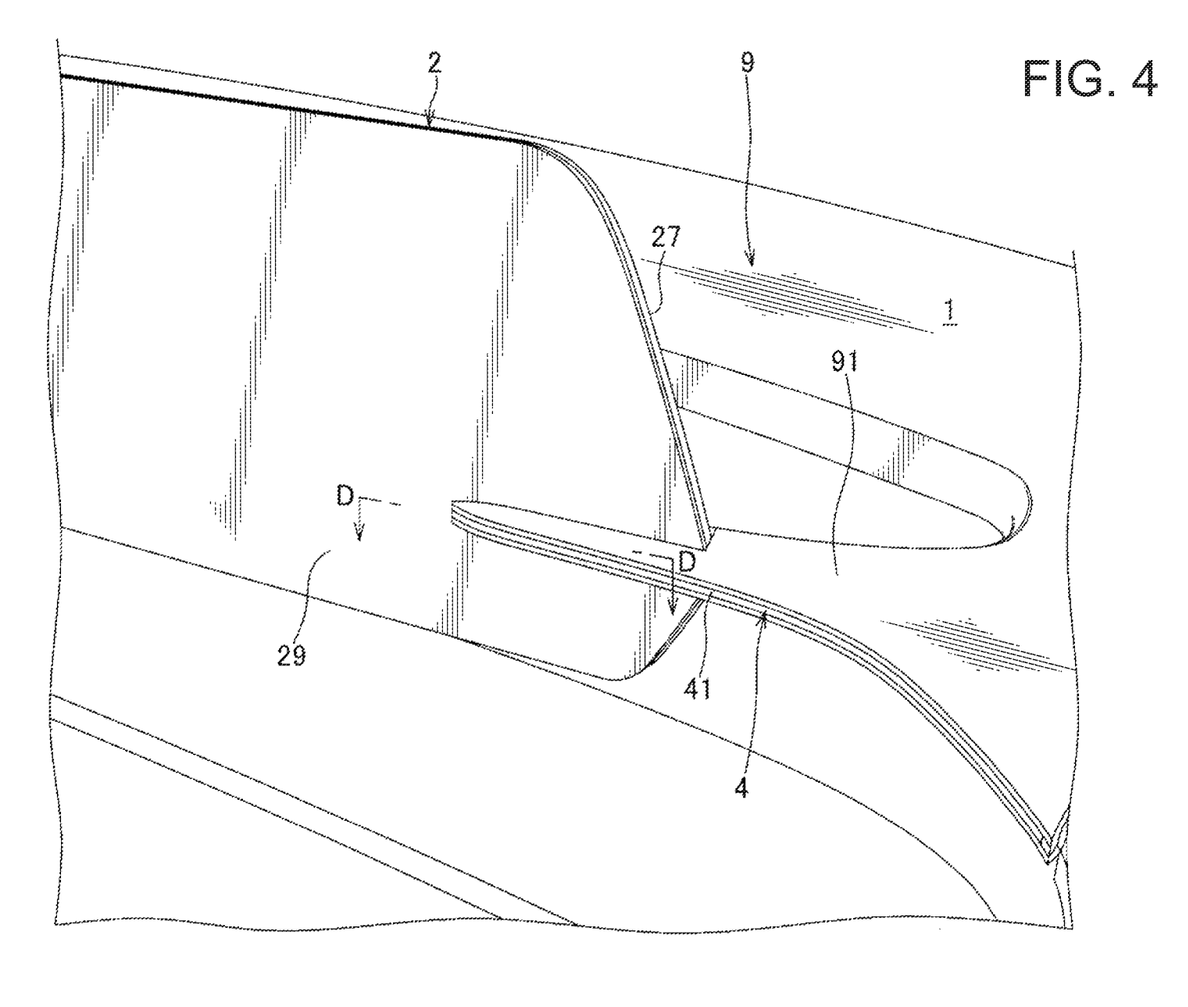
FIG. 4 shows a perspective view of an end of a linear lighting of the display device according to FIG. 1.
Figure 6:
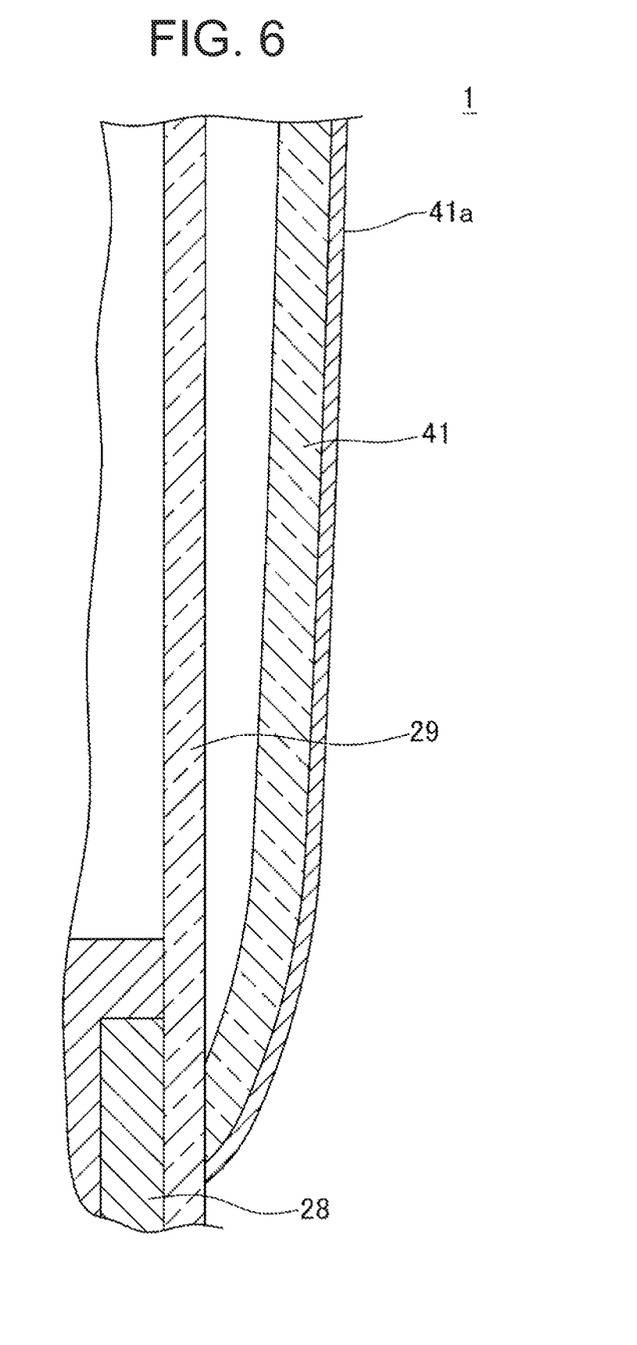
FIG. 6 shows a cross section view along the line D-D in FIG. 4.

Furthermore, in order to connect the linear display section 3 of the display panel 2 to the linear lightings 4, 5 more smoothly and seamlessly, ends of the linear lightings 4 and 5 are overlapped with a driver side of the display panel 2, as shown in FIGS. 4 to 6. Although FIGS. 4 to 6 show only the linear lighting 4, the linear lighting 5 has the same structure.

In FIGS. 4 to 6, reference sign 91 indicates a cover member of the dashboard 9, reference sign 27 indicates a case of the display panel 2, reference sign 28 indicates a TFT liquid crystal panel, and reference sign 29 indicates a cover glass. As shown in FIG. 6, the light guide member 41 of the linear lighting 4 is located gradually closer to a front side (side facing the driver) of the cover glass 29 of the display panel 2 in a direction to a left end of the light guide member 41, wherein the left end is in contact with the front side of the cover glass 29.

The linear display section 3 divides the display panel 2 into two regions, i.e., a first region 21 and a second region 22. The first region 21 is configured for displaying information which is necessary for decision of a driving action, such as various types of meter information, car navigation information, driver assistance information (in the shown example, information of a blind spot monitor is displayed). Further, a vehicle speed display section 23 is displayed on the third linear portion 33 in the present example. In this manner, the first to fifth linear portions include an interrupted part(s). The second region 22 is configured for displaying information which is not related to driving, such as a community icon (friend connected via V-to-V communication) and/or recommendation information from a friend.

The first region 21 and second region 22 have ranges which are changed in a right-left direction depending on their individual information volumes and/or priority. For example, during manual driving, the first region 21 is enlarged as shown in FIG. 2 and (b) in FIG. 3 because it requires a large volume of information which is necessary for decision of the driving action. On the other hand, during autonomous driving, the first region 21 is reduced (the first region 21 and second region 22 have similar sizes) as shown in (a) of FIG. 3 because it requires a smaller volume of information which is necessary for decision of the driving action. In this manner, changing ranges of the first region 21 and the second region 22 is accompanied by changing a boundary between the third linear portion 33 and the fourth linear portion 34 and by changing a boundary between the fourth linear portion 34 and the fifth linear portion 35. This means that lengths of the third linear portion 33 and fifth linear portion 35 are changed and the fourth linear portion 34 is shifted in the right-left direction.

In the present example, information displayed on the display panel 2 is zoned by the linear display section 3 in the above-described manner in order to strive for providing the information to the driver for the sake of better recognition. In addition, the linear lightings 4 to 7 and the linear display section 3 according to the present example perform linked light emission in order to strive for providing the information to the driver for the sake of better recognition. In the following description, a specific example for the linked light emission will be explained.

For example, in the automobile driving, the linear lightings 4 to 7 and the linear display section 3 are set to emit pale-blue lights during autonomous driving. During stopping the autonomous driving, the linear lightings 4 to 7 and linear display section 3 are set to emit amber lights. During manual driving, the linear lightings 4 to 7 and the linear display section 3 are set to emit white lights. In this manner, the driving status is expressed by means of the linked light emission of the linear lightings 4 to 7 and linear display section 3 so that the driver can know the driving status without gazing at a point on the display panel 2 which can avoid mode confusion.

When operating a turn signal in the case of turning right/left and/or in the case of changing a course, a turn lamp indicator (e.g. an arrow mark) in the first region 21 blinks in green, and the linear display section 3 and part of the linear lightings 4 to 7 (e.g. in the case of turning right, a right portion of the third linear portion 33, the second linear portion 32 and first linear portion 31 as well as the linear lightings 4 and 6) blink in green with the same period length as the turn lamp indicator. Their blinking periods are offset to each other (blink with time shift) so that it appears as if a green light were flowing. Further, when a warning of ADAS is issued, the linear lightings 4 to 7 and linear display section 3 blink in amber. By providing the information to the driver in this manner, the driver can know the information intuitively without gazing at one point on the display panel 2.

As described above, the display device 1 includes the linear display section 3 which is positioned in the display panel 2 continuously with ends of the linear lightings 4 and 5, wherein the linear lightings 4 to 7 and the linear display section 3 are configured to be able to perform linked light emission. This means that the linear display section 3 of the display panel 2 and the linear lightings 4 to 7 are in relation to each other. This enables a cockpit design to be provided which has a unity impression with a horizontal theme. Furthermore, the linked light emission of the linear lightings 4 to 7 and the linear display section 3 enables that the information to be provided to the driver instantly and in an easily recognizable manner.

Moreover, the display panel 2 in the display device 1 is divided by the linear display section 3 into two regions, i.e., the first region 21 and the second region 22, which enables the information to be displayed on the display panel 2 to the driver in an easily recognizable manner.

In addition, the display device 1 is configured such that the linear lightings 4 and 5 are placed on both of the right and left sides of the display panel 2, wherein the first linear portion 31 is positioned continuously with an end of the linear lighting 4 on one side of the right side or left side, and the fifth linear portion 35 is positioned continuously with an end of the linear lighting 5 on another side of the right side, which enables the unity impression of the cockpit to be further increased.

Furthermore, the display device 1 is configured such that changing ranges of the first region 21 and the second region 22 depending on their information volumes and/or priority is accompanied by changing the boundary between the third linear portion 33 and the fourth linear portion 34 and by changing the boundary between the fourth linear portion 34 and the fifth linear portion 35, which enables the information displayed on the display panel 2 to be provided to the driver in a more easily recognizable manner.

Moreover, the display device 1 is configured such that the linear lightings 4 to 7 and the linear display section 3 are configured to be able to emit lights of the same color, which enables the unity impression of the cockpit to be further increased. This also enables the information to be provided to the driver in a more easily recognizable manner.

The display device 1 is further configured such that the ends of the linear lightings 4 and 5 are overlapped with the display panel 2 when seen from the driver side so that the linear display section 3 of the display panel 2 and the linear lightings 4 and 5 can be connected more smoothly and seamlessly.

Although the ends of the linear lightings are continuous with (connected to) the linear display section according to the above embodiment, the ends of the linear lightings may not be continuous with the linear display section, and there may be a gap(s) therebetween. In this case, it is only necessary to position the linear display section on extension of the linear lighting(s).

Although the "display panel" according to the above embodiment is configured as a liquid crystal panel, the display panel may be configured with an organic EL panel. Furthermore, the display panel may be configured as a combination of an analog meter (physical meter) and a two-dimensional display panel (liquid crystal panel/organic EL panel). The display panel may not necessarily have a meter function, but it is sufficient that the display panel has some information display function.

Although the "linear display section" according to the above embodiment is configured as an image(s) displayed on the liquid crystal panel, the linear display section may be configured with a physical light emitting entity like the linear lightings.

The above embodiment is configured such that when operating a turn signal, the turn lamp indicator, the linear display section and linear lightings blink with time shift so as to render an effect that it appears as if a green light were flowing. In addition to control of a direction of the flowing, a directional design expression such as ">>>>" may be employed to provide the information to a user in a vehicle independently from animation.

Although according to the present embodiment, only one level (one row) with a linear lighting is provided in the height direction in each position, three or more levels (three or more rows) with linear lightings in the height direction may be provided to express not only information about a direction, but also information such as a distance (height) and/or a degree of danger (magnitude of danger) in a scene which makes recognition difficult and thus requires to call attention, such as a rear side view, which enables various types of information to be provided to the user.

Furthermore, the linear lightings may be used as a low-resolution display device in combination with the display panel to display information such as a map and/or TbyT by extending it to the outside of the display panel. This means that it is possible to easily display information about an area outside a displayed area of the display panel, such as a destination icon.

In addition to MET and/or CID, devices such as mirrors are increasingly used in cockpits. In this regard, they can be used by connecting them in linear lightings having a row(s).

It is to be noted that the embodiments as described above merely illustrate representative examples for the present invention, and the present invention is not limited to these embodiments. I.e., various modifications may be performed without departing from the core of the present invention. It is obvious that such modifications are included in the scope of the present invention as far as the modifications comprise the features of the present invention.

REFERENCE SIGNS LIST

1 Display device for a vehicle
2 Display panel
3 Linear display section
4, 5 Linear lightings
9 Dashboard

What is claimed is:
1. A display device comprising:
 a display panel configured to be placed at a dashboard; and
 a linear lighting configured to be placed at the dashboard, the linear lighting extending along a longitudinal direction of the dashboard,
 wherein a linear display section is positioned in the display panel continuously with an end of the linear lighting or on extension of the linear lighting,
 wherein the linear lighting and the linear display section are configured to be able to perform linked light emission,
 wherein the linear display section includes:
  a first linear portion extending along the longitudinal direction of the dashboard;
  a second linear portion extending upward from an end of the first linear portion;
  a third linear portion extending from an end of the second linear portion along the longitudinal direction of the dashboard;
  a fourth linear portion extending downward from an end of the third linear portion; and
  a fifth linear portion extending from an end of the fourth linear portion along the longitudinal direction of the dashboard, and
 wherein the display panel is divided by the linear display section into two regions which are a first region and a second region.

2. The display device according to claim 1, comprising a plurality of linear lightings,
- wherein the linear lightings are placed on both of a right side and a left side of the display panel, and
- wherein the first linear portion is positioned continuously with an end of a linear lighting on one side of the right side or left side or positioned on extension of the linear lighting on the one side, and
- wherein the fifth linear portion is positioned continuously with an end of a linear lighting on another side of the right side or left side or positioned on extension of the linear lighting on the another side.

3. The display device according to claim 1,
- wherein the display panel is a two-dimensional display panel, and
- wherein the display device is configured such that changing ranges of the first region and the second region is accompanied by changing a boundary between the third linear portion and the fourth linear portion and by changing a boundary between the fourth linear portion and the fifth linear portion.

4. The display device according to claim 2,
- wherein the display panel is a two-dimensional display panel, and
- wherein the display device is configured such that changing ranges of the first region and the second region is accompanied by changing a boundary between the third linear portion and the fourth linear portion and by changing a boundary between the fourth linear portion and the fifth linear portion.

5. The display device according to claim 1,
- wherein the linear lighting and the linear display section are configured to be able to emit lights of a same color.

6. The display device according to claim 1,
- wherein at least one of the ends of the linear lightings is overlapped with the display panel when seen from a driver side.

* * * * *